United States Patent
Zhu et al.

(10) Patent No.: US 10,498,626 B2
(45) Date of Patent: Dec. 3, 2019

(54) METHOD, TRAFFIC MONITOR (TM), REQUEST ROUTER (RR) AND SYSTEM FOR MONITORING A CONTENT DELIVERY NETWORK (CDN)

(71) Applicants: TELEFONAKTIEBOLAGET L M ERICSSON (PUBL), Stockholm (SE); Zhongwen Zhu, Saint-Laurent (CA); Ramakoteswara Muthireddy, Cote Saint-Luc (CA); Nadine Gregoire, Montreal (CA)

(72) Inventors: Zhongwen Zhu, Saint-Laurent (CA); Ramakoteswara Muthireddy, Cote Saint-Luc (CA); Nadine Gregoire, Montreal (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 216 days.

(21) Appl. No.: 15/511,143

(22) PCT Filed: Sep. 24, 2015

(86) PCT No.: PCT/IB2015/057364
§ 371 (c)(1),
(2) Date: Mar. 14, 2017

(87) PCT Pub. No.: WO2016/055893
PCT Pub. Date: Apr. 14, 2016

(65) Prior Publication Data
US 2017/0250888 A1    Aug. 31, 2017

Related U.S. Application Data

(60) Provisional application No. 62/061,888, filed on Oct. 9, 2014.

(51) Int. Cl.
*G06F 15/173* (2006.01)
*H04L 12/26* (2006.01)
(Continued)

(52) U.S. Cl.
CPC ............ *H04L 43/10* (2013.01); *H04L 41/064* (2013.01); *H04L 43/0817* (2013.01);
(Continued)

(58) Field of Classification Search
CPC ..... H04L 43/0817; H04L 43/10; H04L 45/70; H04L 41/064; H04L 43/0894; H04L 43/0864; H04L 43/16; H04L 43/0852
See application file for complete search history.

(56) References Cited

U.S. PATENT DOCUMENTS

| 8,117,306 B1 | 2/2012 | Baumback et al. |
| 8,626,910 B1 | 1/2014 | Lientz |

(Continued)

FOREIGN PATENT DOCUMENTS

| WO | 01/50263 A1 | 7/2001 |

*Primary Examiner* — Cheikh T Ndiaye
(74) *Attorney, Agent, or Firm* — Julie Dufort; Ericsson Canada Inc (57) ABSTRACT

A method, Request Router and Traffic Monitor for monitoring a Content Delivery Network effecting requests routing toward delivery nodes (DNs) without using a load balancer and achieving high availability. Iteratively, for each delivery node, sending a monitoring request to the delivery node. If a response indicative of success of the monitoring request is received from the delivery node before the end of a first time interval, setting a status of the delivery node to indicate success. If a response indicative of failure is received before the end of the first time interval, setting the status to indicate failure. If no response is received before the end of the first time interval, setting the status to indicate indetermination. Iteratively, at a second time interval, taking a snapshot of the
(Continued)

statuses of the delivery nodes and producing a list of DNs with their statuses to be sent to the RR.

21 Claims, 7 Drawing Sheets (51) Int. Cl.
  *H04L 12/24* (2006.01)
  *H04L 12/721* (2013.01)
(52) U.S. Cl.
  CPC ...... *H04L 43/0864* (2013.01); *H04L 43/0894* (2013.01); *H04L 43/16* (2013.01); *H04L 45/70* (2013.01); *H04L 43/0852* (2013.01)

(56) References Cited

U.S. PATENT DOCUMENTS

| | | | |
|---|---|---|---|
| 2005/0160163 A1* | 7/2005 | Nguyen | H04L 41/0213 709/223 |
| 2011/0138064 A1 | 6/2011 | Rieger et al. | |
| 2013/0124724 A1* | 5/2013 | Madgwick | H04L 43/12 709/224 |
| 2013/0339519 A1 | 12/2013 | Lientz | |
| 2014/0215051 A1* | 7/2014 | Schlack | H04L 43/0817 709/224 |

* cited by examiner

METHOD, TRAFFIC MONITOR (TM), REQUEST ROUTER (RR) AND SYSTEM FOR MONITORING A CONTENT DELIVERY NETWORK (CDN)

PRIORITY STATEMENT UNDER 35 U.S.C. S.119(E) & 37 C.F.R. S.1.78

This non-provisional patent application claims priority based upon the prior U.S. provisional patent application entitled "Method, Traffic Monitor (TM), Request Router (RR) and System for monitoring a Content Delivery Network (CDN)", application No. 62/061,888, filed Oct. 9, 2014, in the names of Zhongwen Zhu, Ramakoteswara Muthireddy and Nadine Gregoire.

TECHNICAL FIELD

The present invention relates to a method, Traffic Monitor (TM), Request Router (RR) and system for monitoring a Content Delivery Network (CDN).

BACKGROUND

One goal of a Content Delivery Network (CDN) is to bring the Delivery Nodes (DNs) closer to the end users in order to provide a good user experience and fewer delays in transmitting requested contents. Another consideration for providing a good user experience is that the content delivery service should be available at all time.

However, the High Availability (HA) of a CDN depends upon how quickly the failure of a delivery node is detected, to avoid directing a user request to a delivery node having problems.

For large scale traffic, DN failure detection is critical since thousands of requests per second are handled. Any delay in detecting a failure might lead to a significant number of failed requests.

Accordingly, when a delivery node is found to be down or overloaded, the delivery node is excluded and requests stop being redirected thereto. When the status of the delivery node becomes normal again, the delivery node stops being excluded and requests can be redirect to the delivery node again.

Figure 1:
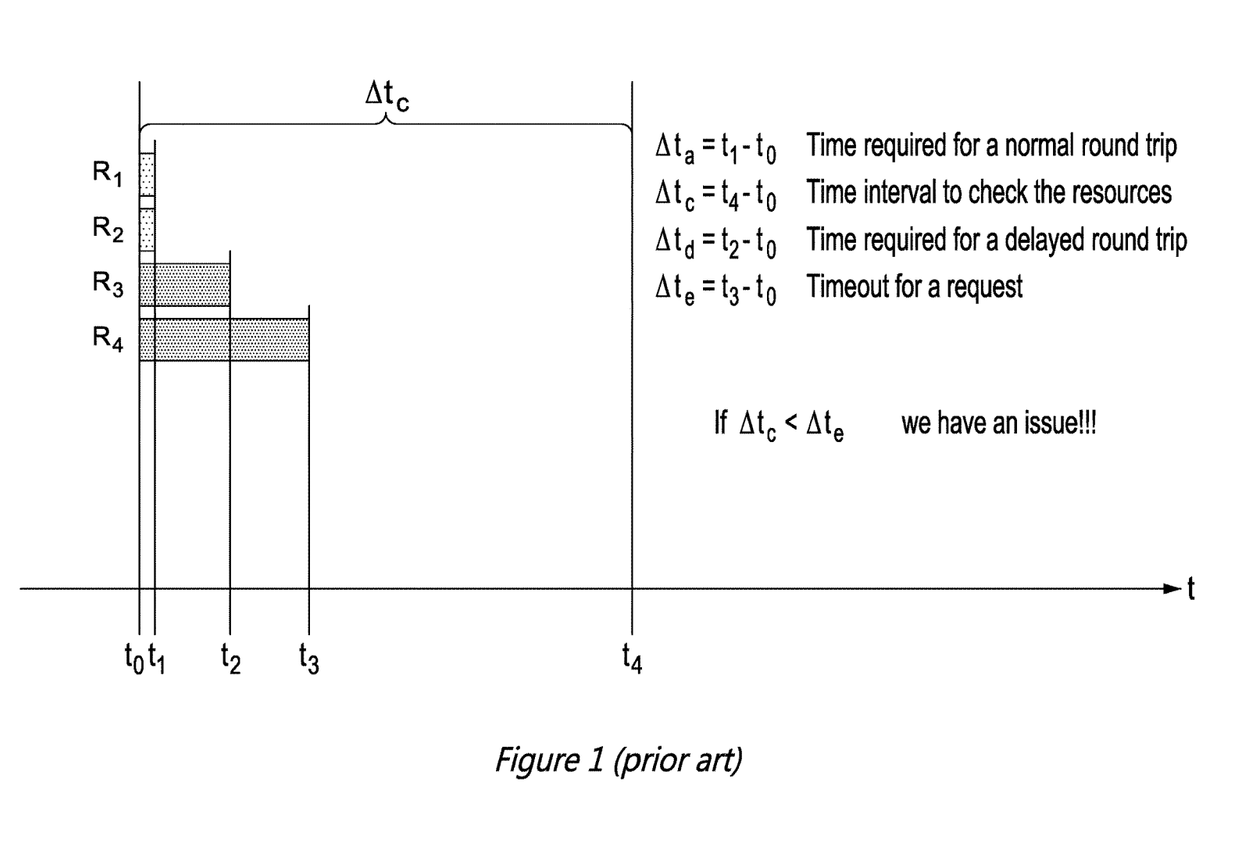
FIG. 1 illustrates a CDN monitoring mechanism of the prior art.

Referring to FIG. 1, a monitoring mechanism is described. In the example, four resources R1, R2, R3 and R4 are monitored. At time t=t0, a Traffic Monitor (TM) sends a request to the four resources simultaneously. The request may be an Internet Control Message Protocol (ICMP) echo, a Transmission Control Protocol (TCP) connection or a Simple Network Management Protocol (SNMP) get request (to retrieve the bandwidth usage), for instance. The first two resources R1 and R2 return responses immediately since these delivery nodes are running without any problem. However, R3 and R4 take more time to response due to network congestion.

The time interval between two consecutive monitoring is configured to be much greater than the timeout for the request, as shown in FIG. 1. In this way, before the next monitoring process starts, the TM has received all the responses, being either success, failure or timeout, from the delivery nodes. This monitoring mechanism works very well.

However, this monitoring process is not suitable for providing high availability of CDNs.

SUMMARY

There is provided a method for monitoring a Content Delivery Network (CDN), the CDN effecting requests routing toward delivery nodes (DNs) without using a load balancer and achieving high availability. The method comprises iteratively, for each delivery node, sending a monitoring request to the delivery node. At each iteration, if a response indicative of success of the monitoring request is received from the delivery node before the end of a first time interval, setting a status of the delivery node to indicate success. If a response indicative of failure of the monitoring request is received from the delivery node before the end of the first time interval, setting the status of the delivery node to indicate failure. If no response to the monitoring request is received from the delivery node before the end of the first time interval, setting the status of the delivery node to indicate indetermination. The method also comprises iteratively, at a second time interval, taking a snapshot of the statuses of the delivery nodes and producing a list of DNs with their statuses to be sent to a Request Router (RR).

There is provided a Request Router (RR) including a Traffic Monitor (TM) function, for monitoring a Content Delivery Network (CDN), the CDN effecting requests routing toward delivery nodes (DNs) without using a load balancer and achieving high availability. The RR comprises processing circuitry and a memory, the memory containing instructions executable by the processing circuitry whereby the RR is operative to iteratively, for each delivery node, send a monitoring request to the delivery node. At each iteration, if a response indicative of success of the monitoring request is received from the delivery node before the end of a first time interval, the RR is operative to set a status of the delivery node to indicate success. If a response indicative of failure of the monitoring request is received from the delivery node before the end of the first time interval, the RR is operative to set the status of the delivery node to indicate failure. If no response to the monitoring request is received from the delivery node before the end of the first time interval, the RR is operative to set the status of the delivery node to indicate indetermination. The RR is also operative to iteratively, at a second time interval, take a snapshot of the statuses of the delivery nodes and produce a list of DNs with their statuses.

There is provided a Traffic Monitor (TM), for monitoring a Content Delivery Network (CDN), the CDN effecting requests routing toward delivery nodes (DNs) without using a load balancer and achieving high availability. The TM comprises processing circuitry and a memory, the memory containing instructions executable by the processing circuitry whereby the TM is operative to iteratively, for each delivery node, send a monitoring request to the delivery node. At each iteration, if a response indicative of success of the monitoring request is received from the delivery node before the end of a first time interval, the TM is operative to set a status of the delivery node to indicate success. If a response indicative of failure of the monitoring request is received from the delivery node before the end of the first time interval, the TM is operative to set the status of the delivery node to indicate failure. If no response to the monitoring request is received from the delivery node before the end of the first time interval, the TM is operative to set the status of the delivery node to indicate indetermination. The TM is also operative to iteratively, at a second time interval, take a snapshot of the statuses of the delivery nodes and produce a list of DNs with their statuses to be sent to a Request Router (RR).

There is provided a Traffic Monitor (TM), for monitoring a Content Delivery Network (CDN), the CDN effecting requests routing toward delivery nodes (DNs) without using a load balancer and achieving high availability. The TM comprises a first processing module operative to iteratively, for each delivery node, send a monitoring request to the delivery node. At each iteration, if a response indicative of success of the monitoring request is received from the delivery node before the end of a first time interval, the first processing module is operative to set a status of the delivery node to indicate success. If a response indicative of failure of the monitoring request is received from the delivery node before the end of the first time interval, the first processing module is operative to set the status of the delivery node to indicate failure. If no response to the monitoring request is received from the delivery node before the end of the first time interval, the first processing module is operative to set the status of the delivery node to indicate indetermination. The TM comprises a second processing module operative to iteratively, at a second time interval, take a snapshot of the statuses of the delivery nodes and produce a list of DNs with their statuses to be sent to a Request Router (RR).

A cloud based system for monitoring a Content Delivery Network (CDN), the CDN effecting requests routing toward delivery nodes (DNs) without using a load balancer and achieving high availability. The cloud based system comprises processing circuitry, a memory and a communication interface, the memory containing instructions executable by the processing circuitry whereby in response to receiving a request via the communication interface the cloud based system is operative to iteratively, for each delivery node, send a monitoring request to the delivery node. At each iteration, if a response indicative of success of the monitoring request is received from the delivery node before the end of a first time interval, the system is operative to set a status of the delivery node to indicate success. If a response indicative of failure of the monitoring request is received from the delivery node before the end of the first time interval, the system is operative to set the status of the delivery node to indicate failure. If no response to the monitoring request is received from the delivery node before the end of the first time interval, the system is operative to set the status of the delivery node to indicate indetermination. The system is also operative to iteratively, at a second time interval, take a snapshot of the statuses of the delivery nodes and produce a list of DNs with their statuses to be sent as an output through the communication interface.

DETAILED DESCRIPTION

The various features of the invention will now be described with reference to the figures. These various aspects are described hereafter in greater detail in connection with exemplary embodiments and examples to facilitate an understanding of the invention, but should not be construed as limited to these embodiments. Rather, these embodiments are provided so that the disclosure will be thorough and complete, and will fully convey the scope of the invention to those skilled in the art.

Many aspects of the invention are described in terms of sequences of actions or functions to be performed by elements of a computer system or other hardware capable of executing programmed instructions. It will be recognized that the various actions could be performed by specialized circuits, by program instructions being executed by one or more processors, or by a combination of both. Moreover, the invention can additionally be considered to be embodied entirely virtually or within any form of computer readable carrier or carrier wave containing an appropriate set of computer instructions that would cause a processor to carry out the techniques described herein.

In some alternate implementations, the functions/acts may occur out of the order noted in the sequence of actions. Furthermore, in some illustrations, some blocks may be optional.

Figure 2:
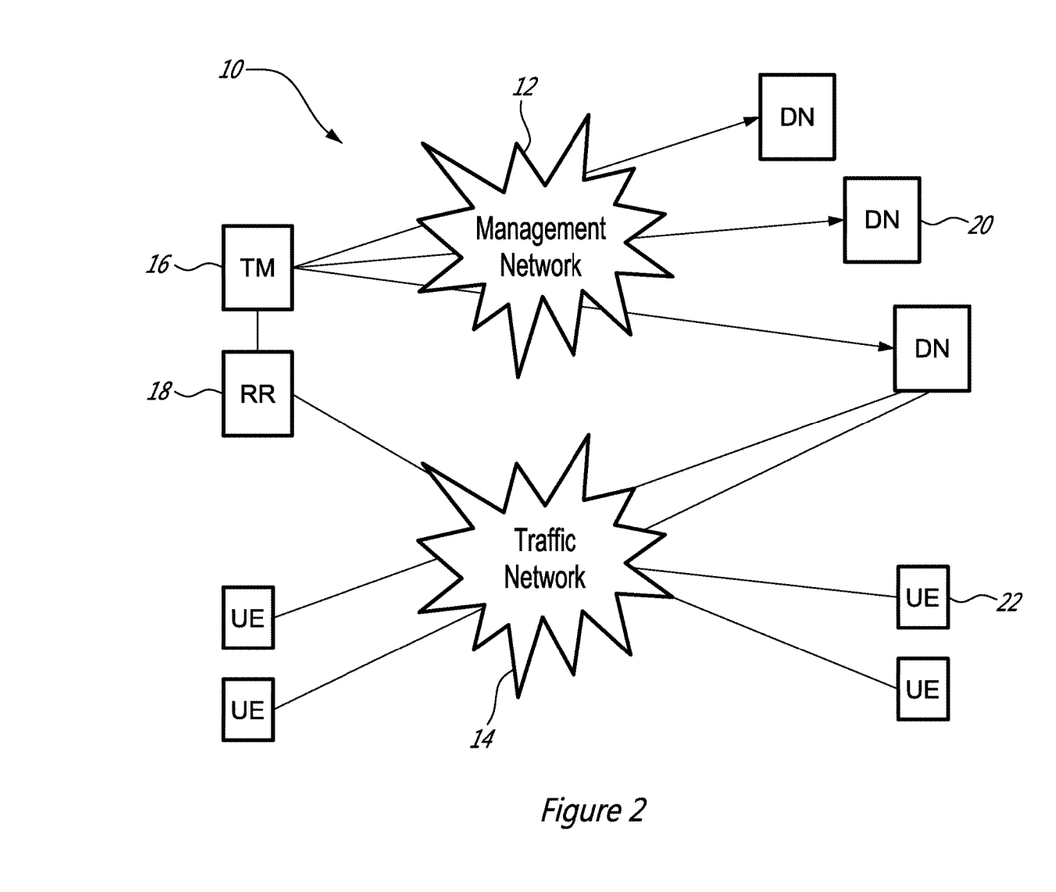
FIG. 2 illustrates an overview of a management network and of a traffic network in a CDN.

FIG. 2 illustrates a Content Delivery Network (CDN) 10, which comprises management network 12 and traffic network 14. In CDN 10, three main components are provided, namely the Request Router (RR) 18, the Traffic Monitor (TM) 16 and the Delivery Nodes (DN) 20. The traffic may be requested by User Equipment UE 22 or other types of devices. In a CDN 10, when no load balancer is placed in front of the Delivery Nodes (for cost reduction, for reduction of deployment complexity or for reducing hardware) high availability depends upon how quickly the Request Router detects the failure of a delivery node.

When the delivery node is put back into service or when a new node is added, the RR 18 should also be notified without delay to allow it to distribute traffic to this newly recovered or added node.

As mentioned earlier, for large scale traffic, the failure detection mechanism is critical since the RR 18 may handle thousands requests per second. Any delay in detecting the failure of a node in a peak hour might lead to a significant number of failed requests.

The RR 18 is a central piece in a CDN 10. Upon receiving the incoming request, the RR 18 decides which DN 20 will be used to serve the request. This decision is usually based on criteria such as the location of the client who is making the request and the overall status of the delivery nodes in the network, e.g. the Central Processing Unit (CPU) load, the bandwidth usage, the node status (up or down), for each node in the network.

The Traffic Monitor is the entity responsible for monitoring the status of the delivery nodes in the network. Normally, the TM 16 is deployed in a central location while the delivery nodes are deployed in different physical locations, which are closer to the potential clients or end users.

When a delivery node is found to be down or overloaded, the TM 16 informs the RR 18 to exclude this delivery node. When the status of the delivery node becomes normal again, the TM 16 also notifies the RR 18 so that the RR 18 can redirect traffic to the recovered delivery node.

Referring back to FIG. 1, a monitoring mechanism as in use nowadays was described. As explained previously, the TM 16 launches the monitoring process to monitor all the delivery nodes periodically. At each time interval, the TM 16 simultaneously sends a monitoring request to all the delivery nodes. The time interval between two consecutive monitoring processes is configured to be much greater than the timeout for the monitoring request, as shown in FIG. 1. A time interval is a period of time of definite length marked by two instants, e.g. a beginning and an end. A timeout is a cancellation or cessation that automatically occurs when a predefined interval of time has passed without a certain event occurring, such as receiving a response. In this way, before the next monitoring process starts, the TM 16 receives all the responses from the delivery nodes and provides the corresponding resource information to RR 18.

In order to have the high availability of a CDN 10, the time interval for monitoring the delivery nodes needs to be reduced, because hundreds or thousands of requests may be redirected to a DN 20 during each time interval, which is a time long enough for a DN 20 to become overloaded or to fail.

However, if the time interval is reduced to be closer or less than the timeout for the monitoring request, the TM 16 encounters another problem, which is defined as how to provide accurate resource information to the RR 18.

As a consequence of receiving outdated information, the RR 18 might redirect the incoming traffic to a delivery node that is either overloaded or down.

Figure 3:
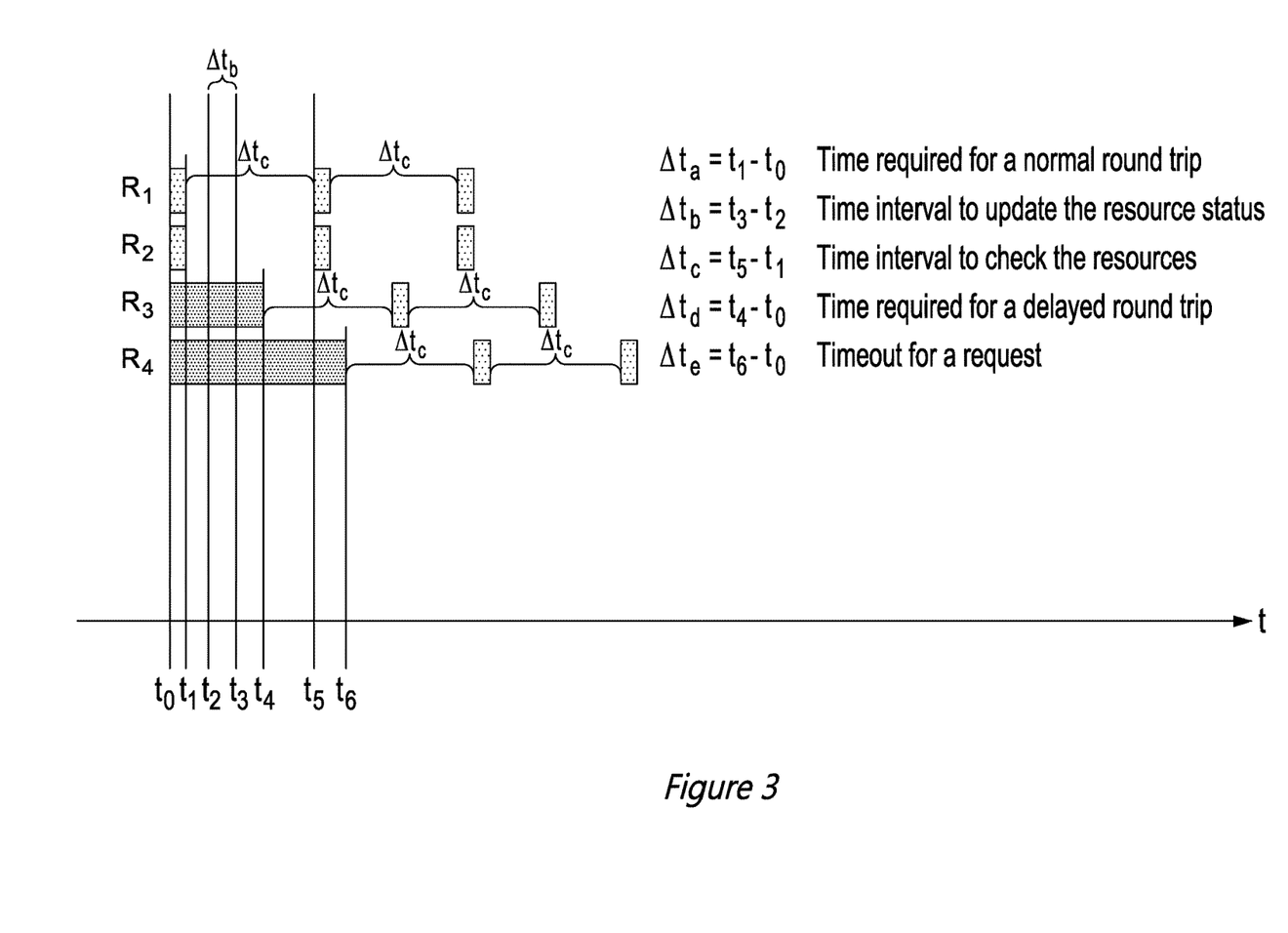
FIG. 3 illustrates a monitoring mechanism in a CDN according to an embodiment.

Referring now to FIG. 3, instead of launching the monitoring process for all the resources at the same time, each resource can be handled independently and the time interval can be defined for all the nodes, for subsets of nodes or for each node separately. A configuration parameter is therefore introduced in TM 16 for the time interval, which is used to re-launch the monitoring process after receiving the response or timeout, referring to $\Delta t_c$ in FIG. 3. This allows the monitoring to be done on a node at a shorter interval, without having to wait for the timeout of another node or for a general, longer, time interval to be expired.

In addition to sending monitoring requests to each node separately, another process is designed to take the snapshot of all the resources at given points in time.

This process of taking snapshots for the whole CDN 10 may be used to get the status of delivery nodes for which a response was received for the last monitoring request or that are due to timeout. Since this other process only retrieves the DN statuses based upon a timestamp, the time interval for taking snapshots can be set much smaller than the time interval used for monitoring the resources ($\Delta t_c$).

Therefore we now have a system which sends monitoring requests to the nodes individually and that, upon receiving a response, waits a predetermined amount of time before sending the next monitoring request. In addition to this, a parallel process takes snapshots of the whole CDN 10 at another interval, which may by shorter, to get a status for the nodes of the CDN 10 on a larger scale.

At each snapshot, the TM 16 provides a list, a "white list" or a "blacklist" to the RR 18. The list indicates the statuses of the nodes, for example "on" or "off".

One will notice that some nodes of the CDN 10 will not have a defined status at the time of the snapshot, either because no response is received yet for the monitoring request or because the timeout delay is reached or exceeded and a new monitoring request is not sent yet. Such exceptions can be taken care of by adding a new status for the CDN 10 nodes.

The new status that the TM 16 may provide to the RR 18 corresponds to a "suspicious" state. Suspicious means that the status has not or cannot be determined at the snapshot time. The "suspicious" status is added to the regular "on" and "off" statuses, for example. It should be noted that suspicious is a name for representing a status that is unde-fined or undetermined. "Undefined", "undetermined" or another name could be used interchangeably.

Further, it is envisioned that further additional statuses could be added and used in the same spirit, to define additional states.

With these modifications, it is possible to reduce the time interval for monitoring resources significantly and the time interval can be set to less than the timeout for a monitoring request. With these modifications, it is therefore possible to achieve higher availability at the scale of the whole CDN 10.

Other advantages are procured by a more frequent monitoring of the CDN DNs 20. For instance, higher level data can be extracted from the monitoring of the individual nodes, allowing to detect if groups of nodes, regions within the CDN 10 or even the entire network are slow or down, and to take corrective measures to redirect traffic and handle requests accordingly.

The following two embodiments are given to illustrate how the proposed monitoring mechanism can work.

Figure 4:
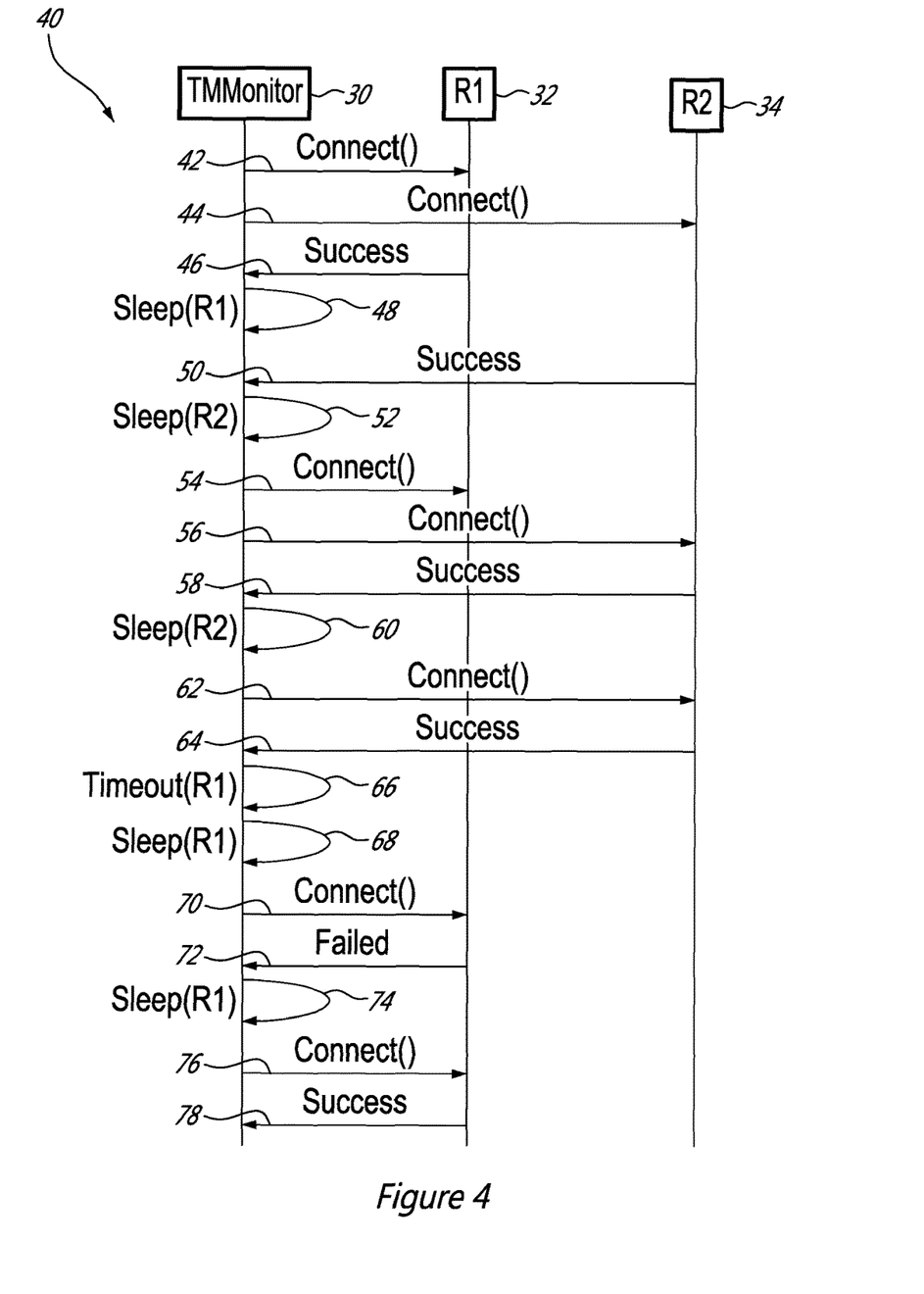
FIG. 4 illustrates a flow for monitoring resources according to an embodiment.

Referring to FIG. 4, a Traffic Monitor Monitoring resource process (TMMonitor) 30 sends "connect" monitoring requests 42, 44 to its monitored resources R1 32 and R2 34, i.e. the delivery nodes, periodically. The sequential or subsequent "connect" monitoring requests 54, 56 towards the same delivery nodes are made only after the responses 46, 50 to the previous monitoring requests are received or after a timeout 66 is reached. Therefore the sending of the monitoring requests is not synchronized for all the delivery nodes.

The TMMonitor of FIG. 4 sends two monitoring requests 42, 44 to two different resources R1 32 and R2 34 respectively. In a normal case, both resources return their responses 46, 50 immediately. Then after receiving the response, the TMMonitor schedules the next iteration of sending monitoring requests 54, 56 towards R1 32 and R2 34 respectively according to the time interval given via the configuration. The sleep periods 48, 52, 60 are delays to reach the end of the configured time interval after receiving success responses 44, 46, 58.

The second part of the flow describes the error scenario due to network congestion. After sending the monitoring requests 54, 56 to R1 32 and R2 34, TMMonitor 30 doesn't receive the response (to the request of step 54) from the first resource R1 32, but it does get the immediate answer 58 from second resource R2 (to the request of step 56). Then the TMMMonitor 30 schedules the next checking operation 62 for R2 34 first then receives success response 64 from R2 but still wait for the response from R1. When "timeout" is reached for R1, at step 66, the TMMonitor marks "timeout" for R1, sleeps, step 68, and reschedules the next checking operation 70 towards R1 32.

Eventually, when R1 is really down, it returns the error (failed) immediately as shown in step 72. After the fail, there is a sleep period 74 for R1 and another monitoring request 76 and success response 78 follow.

Figure 5:
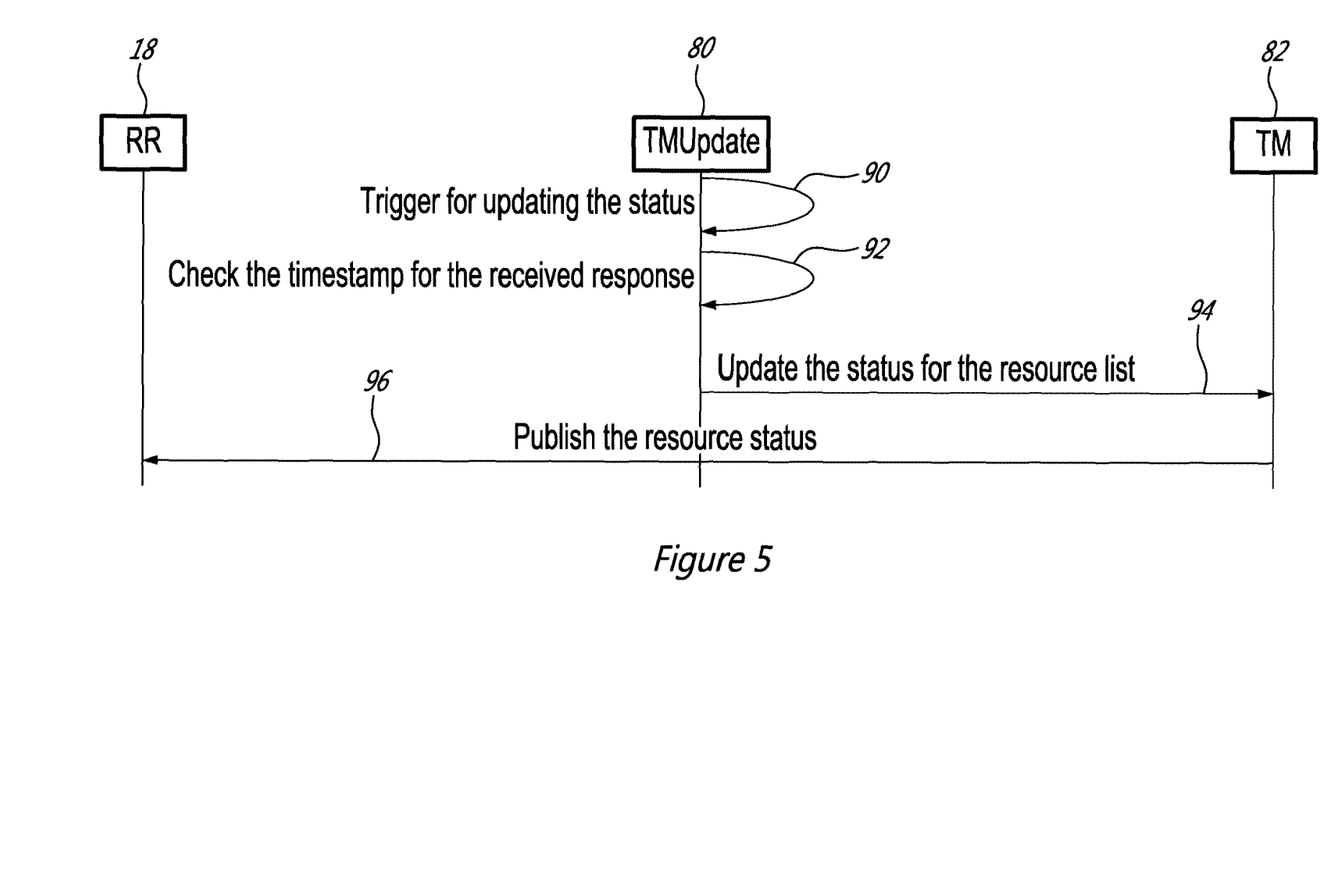
FIG. 5 illustrates a flow for updating the status of delivery nodes according to an embodiment.

Referring to FIG. 5, according to the given time interval (via a configuration parameter), for each delivery node status, a Traffic Monitor Updating resource status process (TMUpdate 80) checks the timestamp when the latest status was received for the DNs 20 of the CDN 10. It may decide to trigger for updating the status, step 90, then check the timestamp for the received response, step 92.

If the latest timestamp is within the current time interval for a DN 20, it takes this status and updates the corresponding resource in the list, step 94, the "while list" or "blacklist" with the corresponding "on" of "off" status.

After going through all the resources in the list, the TMUpdate send/publish, step 96, the updated status list to RR 18, which directs the incoming traffic to the proper delivery node afterwards. If none of the resources in the list has received the response (status update), the TMUpdate does not necessarily needs to send/publish any list to RR 18.

Alternatively, the new status undetermined or suspicious can be used to define the state of the nodes which are not responding or that are in timeout, such as in step 66 of FIG. 4.

Some advantages of the method described herein include making the CDN 10 highly available, without the need for costly hardware such as a load balancer for achieving High Availability (HA).

Figure 6:
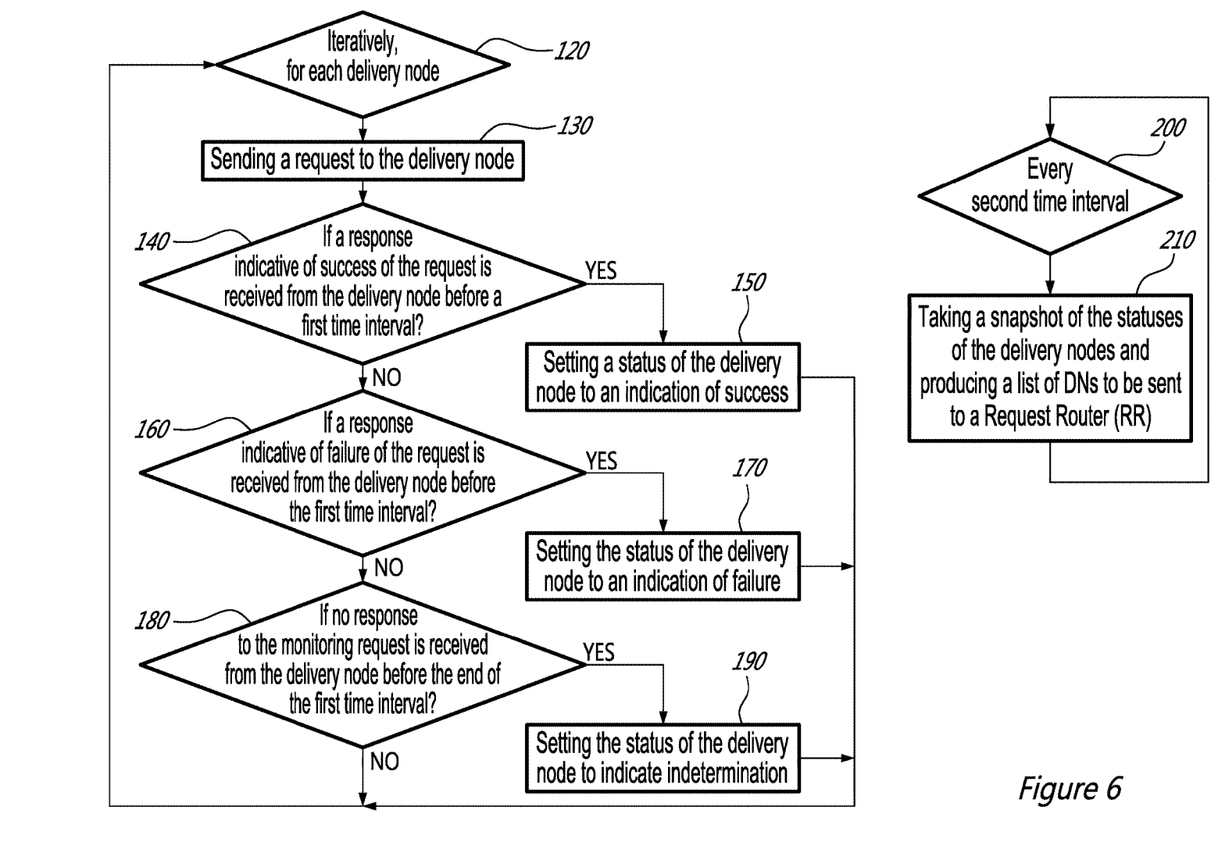
FIG. 6 illustrates a method according to an embodiment.

FIG. 6 provides a pair of flowcharts illustrating a method according to an embodiment. The method is for monitoring a Content Delivery Network 10. The CDN 10 effects requests routing toward delivery nodes 20 without using a load balancer and achieves high availability. In the method, a monitoring request is sent, step 130, to the delivery node, iteratively for each delivery node, step 120. If a response indicative of success of the monitoring request is received from the delivery node before the end of a first time interval, step 140, a status of the delivery node is set to indicate success, step 150. If a response indicative of failure of the monitoring request is received from the delivery node before the end of the first time interval, step 160, the status of the delivery node is set to indicate failure, step 170. If no response to the monitoring request is received from the delivery node before the end of the first time interval, step 180, the status of the delivery node is set to indicate indetermination, step 190. As a separate process, the method iteratively, at a second time interval, step 200, take a snapshot, step 210, of the statuses of the delivery nodes and produce a list of DNs 20 with their statuses to be sent to a Request Router 18.

The monitoring request can be either one of an Internet Control Message Protocol (ICMP) echo, a Transmission Control Protocol (TCP) connection or TCP SYN, a Simple Network Management Protocol (SNMP) get request, a Hypertext Transfer Protocol (HTTP) request or any other service level request.

The response indicative of success of the monitoring request can be either one of an ICMP echo reply, a TCP connection Acknowledgement (ACK), a SNMP ret response, a HTTP 200 OK or any other appropriate service level response.

The indication of success can take the form of a value, a field, a string such as: "available", "on", "alive", "running", "up", any of the responses indicative of success enumerated in the previous paragraphs or any other relevant data or value known in the art.

If a response indicative of a success of the monitoring request is received from the delivery node after the end of the first time interval but before a timeout period, the status of the delivery node is set to indicate indetermination. If a response is received after the end of the first time interval but before the timeout, the next iteration for the delivery node starts immediately after the response is received.

The response indicative of success may comprise a bandwidth capacity of the node. For each delivery node, delivery node data such as node availability and bandwidth can be provided in the responses indicative of success. Such delivery node data may comprise statuses such as available, unavailable and undetermined.

The response indicative of failure of the monitoring request can be either one of an ICMP echo error message (rejection), a TCP rejection, a SNMP error, a HTTP 5xx or any other appropriate service level response such as a response indicative that a bandwidth exceeds a given threshold.

The indication of failure may be a value, a field or a string such as: "unavailable", "off", "down", "stalled", "not responding", any of the responses indicative of failure enumerated in the previous paragraphs or any other relevant data or value known in the art.

If the response indicative of success or of failure is received and the first time interval for the delivery node is not reached, a sleep mode is entered until the time interval for the delivery node is reached.

If no response is received before the end of a timeout period, the next iteration for the delivery node starts immediately after the end of the timeout period and the status is set to indicate timeout.

According to example embodiments of the method, the first and second time interval may be configurable and the first time interval may be configurable for every delivery node separately. For one of more delivery node, the first time interval may be in a range of 1 to 50 milliseconds, where a suitable value for the first time interval could be 10 milliseconds, for example. The timeout period may be in a range of 250 to 1000 milliseconds. The second time interval may be in the range of 50 of 150 milliseconds.

According to the method, the list of DNs 20 with their statuses may comprise all the DNs 20 of the CDN 10. But the list of DNs 20 with their statuses may also comprise DNs having an updated status only. That means that the list of DNs 20 with their statuses may excludes DNs for which the status was not updated at the time of the snapshot.

When producing a list of DNs 20 with their statuses, timeout statuses may be converted into statuses to indicate indetermination, which alternately could be named: undefined, suspicious or undetermined.

From the statuses, a state of the whole CDN 10, of delivery nodes from a region or of a group of delivery nodes can be extracted or determined. For example, this determination can be made by counting a number of DNs 20 with each status. The state can be determined by computing percentage of the delivery nodes, a region, a subset or a group of delivery nodes having a status set to indicate failure, success or indetermination, for example. This computed CDN state may be indicative of a network problem and when detected, an alarm message can be sent to a network operator.

Figure 7:
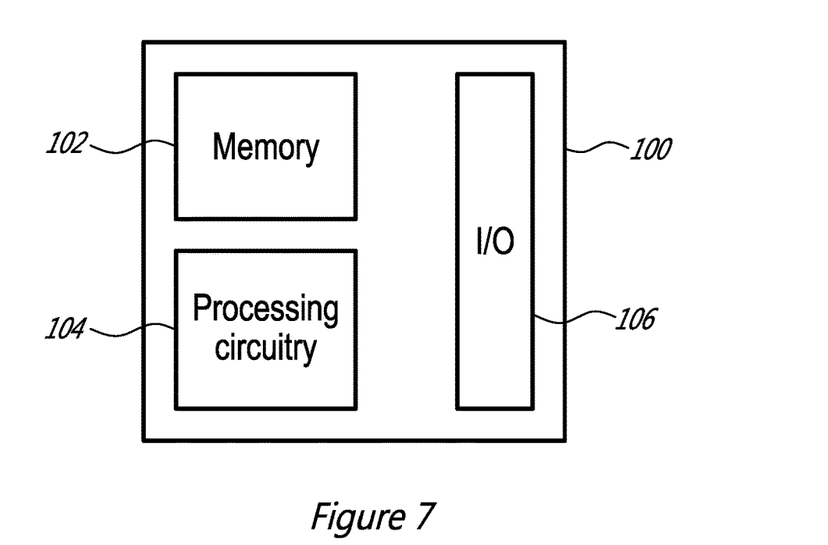
FIG. 7 illustrates a network node according to an embodiment.
Figure 8:
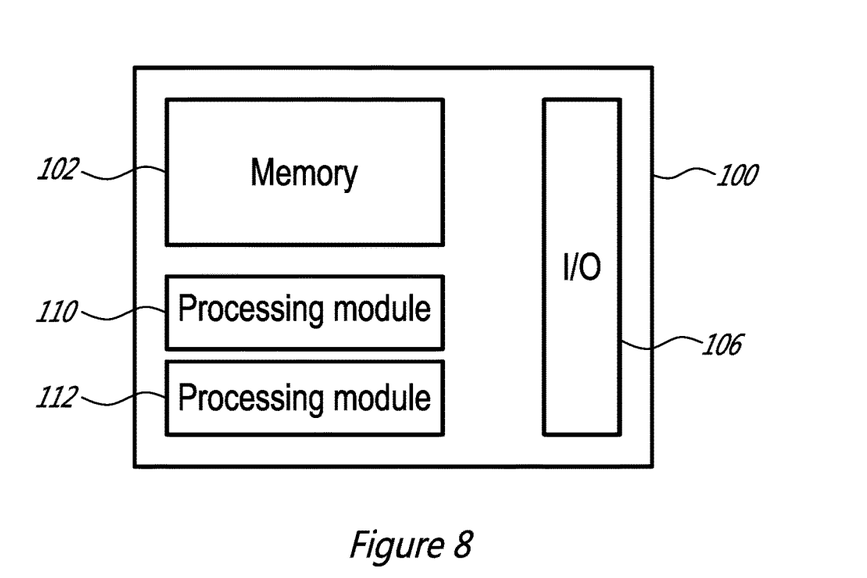
FIG. 8 illustrates a Traffic Monitor according to another embodiment.

FIGS. 7 and 8 are block diagrams of nodes suitable for implementing aspects of the embodiments disclosed herein. As discussed above, in the context of a CDN system, the node 100 may comprise a communications interface 106. The communications interface 106 generally includes analog and/or digital components for sending and receiving communications to and from other nodes, such as delivery nodes, and request routers, either directly or via a network. Those skilled in the art will appreciate that the block diagrams of the node 100 necessarily omits numerous features that are not necessary for a complete understanding of this disclosure.

Referring to FIG. 7, an example of a node which can implement aspects of the embodiments described above is a Request Router 18 including a Traffic Monitor (TM) function for monitoring a Content Delivery Network 10. Traffic Monitor function may be implemented inside the Request Router as a function or can be collocated with the Request Router in a virtualized environment. The CDN 10 effects requests routing toward delivery nodes 20 without using a load balancer and achieves high availability. The RR 18 comprises processing circuitry 104 and a memory 102, the memory 102 contains instructions executable by the processing circuitry 104 whereby the RR 18 is operative to iteratively, for each delivery node, send a monitoring request to the delivery node. If a response indicative of success of the monitoring request is received from the delivery node before the end of a first time interval, a status of the delivery node is set to indicate success. If a response indicative of failure of the monitoring request is received from the delivery node before the end of the first time interval, the status of the delivery node is set to indicate failure. If no response to the monitoring request is received from the delivery node before the end of the first time interval, the status of the delivery node is set to indicate indetermination. The RR 18 is also operative to iteratively, at a second time interval, take a snapshot of the statuses of the delivery nodes and to produce a list of DNs 20 with their statuses.

Still referring to FIG. 7, another example of a node which can implement aspects of the embodiments described above is a Traffic Monitor (TM), for monitoring a Content Delivery Network 10. The CDN 10 effects requests routing toward delivery nodes 20 without using a load balancer and achieves high availability. The TM 16 comprises processing circuitry 104 and a memory 102, the memory 102 contains instructions executable by the processing circuitry 104 whereby the TM 16 is operative to iteratively, for each delivery node, send a monitoring request to the delivery node. If a response indicative of success of the monitoring request is received from the delivery node before the end of a first time interval, a status of the delivery node is set to indicate success. If a response indicative of failure of the monitoring request is received from the delivery node before the end of the first time interval, the status of the delivery node is set to indicate failure. If no response to the monitoring request is received from the delivery node before the end of the first time interval, the status of the delivery node is set to indicate indetermination. The TM 16 is also operative to iteratively, at a second time interval, take a snapshot of the statuses of the delivery nodes and to produce a list of DNs 20 with their statuses to be sent to a Request Router 18.

Referring to FIG. 8, yet another example of a node which can implement aspects of the embodiments described above is a Traffic Monitor 16, for monitoring a Content Delivery Network 10. The CDN 10 effects requests routing toward delivery nodes 20 without using a load balancer and achieves high availability. The TM 16 comprises a first processing module 110 operative to iteratively, for each delivery node, send a monitoring request to the delivery node. If a response indicative of success of the monitoring request is received from the delivery node before the end of a first time interval, a status of the delivery node is set to indicate success. If a response indicative of failure of the monitoring request is received from the delivery node before the end of the first time interval, the status of the delivery node is set to indicate failure. If no response to the monitoring request is received from the delivery node before the end of the first time interval, the status of the delivery node is set to indicate indetermination. The TM 16 further comprises a second processing module 112 operative to iteratively, at a second time interval, take a snapshot of the statuses of the delivery nodes and to produce a list of DNs 20 with their statuses to be sent to a Request Router 18.

Further, referring back to FIGS. 2 and 7, a cloud based system can also implement aspects of the embodiments described above for monitoring a Content Delivery Network 10. The CDN 10 effects requests routing toward delivery nodes 20 without using a load balancer and achieves high availability. The cloud based system comprises processing circuitry 104, a memory 102 and a communication interface, the memory 102 contains instructions executable by the processing circuitry 104 whereby in response to receiving a request via the communication interface the cloud based system is operative to iteratively, for each delivery node, send a monitoring request to the delivery node. If a response indicative of success of the monitoring request is received from the delivery node before the end of a first time interval, a status of the delivery node is set to indicate success. If a response indicative of failure of the monitoring request is received from the delivery node before the end of the first time interval, the status of the delivery node is set to indicate failure. If no response to the monitoring request is received from the delivery node before the end of the first time interval, the status of the delivery node is set to indicate indetermination. The cloud based system is also operative to iteratively, at a second time interval, take a snapshot of the statuses of the delivery nodes and to produce a list of DNs 20 with their statuses to be sent as an output through the communication interface.

Although all of the details of the node 100 are not illustrated, the node 100 comprises one or several general-purpose or special-purpose processors 104 or other processing circuitry or microcontrollers programmed with suitable software programming instructions and/or firmware to carry out some or all of the functionality of the nodes 100 described herein. In addition, or alternatively, the node 100 may comprise various digital hardware blocks (e.g., one or more Application Specific Integrated Circuits (ASICs), one or more off-the-shelf digital or analog hardware components, or a combination thereof) (not illustrated) configured to carry out some or all of the functionality of the nodes 100 described herein. A memory 102, such as a random access memory (RAM), may be used by the processor 104 to store data and programming instructions which, when executed by the processor 104, implement all or part of the functionality described herein. The node 100 may also include one or more storage media (not illustrated) for storing data necessary and/or suitable for implementing the functionality described herein, as well as for storing the programming instructions which, when executed on the processor 104, implement all or part of the functionality described herein. One embodiment of the present disclosure may be implemented as a computer program product that is stored on a computer-readable storage medium, the computer program product including programming instructions that are configured to cause the processor 104 to carry out the steps described herein.

Further, part or all of the embodiments described above may be implemented in a cloud environment in virtual machines or equivalent, and in a located or distributed manner.

Modifications and other embodiments of the disclosed invention will come to mind to one skilled in the art having the benefit of the teachings presented in the foregoing description and the associated drawings. Therefore, it is to be understood that the invention is not to be limited to the specific embodiments disclosed and that modifications and other embodiments are intended to be included within the scope of this disclosure. Although specific terms may be employed herein, they are used in a generic and descriptive sense only and not for purposes of limitation.

The invention claimed is:

1. A method for monitoring a Content Delivery Network (CDN) said CDN effecting requests routing toward delivery nodes (DNs) without using a load balancer and achieving high availability, the method comprising:
iteratively, for each delivery node:
sending a monitoring request to the delivery node;
if a response indicative of success of the monitoring request is received from the delivery node before the end of a first time interval, setting a status of the delivery node to indicate success;
if a response indicative of failure of the monitoring request is received from the delivery node before the end of the first time interval, setting the status of the delivery node to indicate failure;
if no response to the monitoring request is received from the delivery node before the end of the first time interval, setting the status of the delivery node to indicate indetermination; and
iteratively, at a second time interval:
taking a snapshot of the statuses of the delivery nodes and producing a list of DNs with their statuses to be sent to a Request Router (RR).

2. The method of claim 1, wherein the monitoring request is an Internet Control Message Protocol (ICMP) echo, a Transmission Control Protocol (TCP) connection or TCP SYN, a Simple Network Management Protocol (SNMP) get request, a Hypertext Transfer Protocol (HTTP) request or any other service level request.

3. The method of claim 1, wherein the response indicative of success of the monitoring request is an ICMP echo reply, a TCP connection Acknowledgement (ACK), a SNMP ret response, a HTTP 200 OK or any other appropriate service level response.

4. The method of claim 1, wherein the response indicative of failure of the monitoring request is an ICMP echo error message (rejection), a TCP rejection, a SNMP error, a HTTP 5xx or any other appropriate service level response such as a response indicative that a bandwidth exceeds a given threshold.

5. The method of claim 1, wherein the indication of success and the indication of failure are values or strings.

6. The method of claim 1, wherein the first and second time interval are configurable and wherein the first time interval is configurable for every delivery node.

7. The method of claim 1, wherein:
if a response indicative of a success of the monitoring request is received from the delivery node after the end of the first time interval but before a timeout period, setting the status of the delivery node to indicate indetermination.

8. The method of claim 1, wherein:
if the response indicative of success or of failure is received and the first time interval for the delivery node is not reached, entering a sleep mode until the time interval for the delivery node is reached.

9. The method of claim 1, wherein if a response is received after the end of the first time interval but before the timeout, the next iteration for the delivery node starts immediately after the response is received.

10. The method of claim 1, wherein if no response is received before the end of a timeout period, the next iteration for the delivery node starts immediately after the end of the timeout period and the status is set to indicate timeout.

11. The method of claim 10, wherein the step of producing a list of DNs with their statuses comprises converting timeout statuses into statuses to indicate indetermination.

12. The method of claim 1, wherein the list of DNs with their statuses comprises all the DNs of the CDN.

13. The method of claim 1, wherein the list of DNs with their statuses comprises DNs having an updated status only.

14. The method of claim 1, wherein the list of DNs with their statuses excludes DNs for which the status was not updated at the time of the snapshot.

15. The method of claim 1, wherein the response indicative of success comprises a bandwidth capacity of the node.

16. The method of claim 1, wherein, for each delivery node, delivery node data such as node availability and bandwidth is provided in the responses indicative of success.

17. The method of claim 1, wherein a state of the whole CDN, of delivery nodes from a region or of a group of delivery nodes is determined from the list of statuses by counting a number of DNs with each status.

18. The method of claim 17, wherein the state is determined by computing percentage of delivery nodes, a region, a subset or a group of delivery nodes having a status set to indicate failure or indetermination.

19. The method of claim 17, wherein the state is indicative of a network problem and wherein an alarm message is sent to a network operator.

20. A Request Router (RR) including a Traffic Monitor (TM) function, for monitoring a Content Delivery Network (CDN), said CDN effecting requests routing toward delivery nodes (DNs) without using a load balancer and achieving high availability, comprising processing circuitry and a memory, said memory containing instructions executable by said processing circuitry whereby said RR is operative to:
iteratively, for each delivery node:
send a monitoring request to the delivery node;
if a response indicative of success of the monitoring request is received from the delivery node before the end of a first time interval, set a status of the delivery node to indicate success;
if a response indicative of failure of the monitoring request is received from the delivery node before the end of the first time interval, set the status of the delivery node to indicate failure;
if no response to the monitoring request is received from the delivery node before the end of the first time interval, set the status of the delivery node to indicate indetermination; and
iteratively, at a second time interval:
take a snapshot of the statuses of the delivery nodes and produce a list of DNs with their statuses.

21. A Traffic Monitor (TM), for monitoring a Content Delivery Network (CDN), said CDN effecting requests routing toward delivery nodes (DNs) without using a load balancer and achieving high availability, comprising processing circuitry and a memory, said memory containing instructions executable by said processing circuitry whereby said TM is operative to:
iteratively, for each delivery node:
send a monitoring request to the delivery node;
if a response indicative of success of the monitoring request is received from the delivery node before the end of a first time interval, set a status of the delivery node to indicate success;
if a response indicative of failure of the monitoring request is received from the delivery node before the end of the first time interval, set the status of the delivery node to indicate failure;
if no response to the monitoring request is received from the delivery node before the end of the first time interval, set the status of the delivery node to indicate indetermination; and
iteratively, at a second time interval:

take a snapshot of the statuses of the delivery nodes and produce a list of DNs with their statuses to be sent to a Request Router (RR).

* * * * *